Patented Nov. 15, 1932

1,888,187

UNITED STATES PATENT OFFICE

ARTHUR STOLL AND ALBERT HOFMANN, OF BASEL, SWITZERLAND, ASSIGNORS TO CHEMICAL WORKS FORMERLY SANDOZ, OF BASEL, SWITZERLAND

GLUCOSAMINIC SALTS OF ANTIMONY

No Drawing. Application filed November 6, 1931, Serial No. 573,520, and in Germany November 10, 1930.

This invention relates to the preparation of new complex and therapeutically valuable antimony salts of the glucosaminic acid.

In our co-pending application Ser. No. 573,289 filed on the same day, there has been described a process for the preparation of glucosaminic acid salts of metals of the iron group, which can be obtained by treating glucosaminic acid or its salts with salts of the metals of the iron group.

It has now been found that the glucosaminic acid and its salts yield with antimony and antimony compounds new salts, wherein the metal is linked in a much more complex manner as compared to the salts prepared from hydroxycarboxylic acids free from nitrogen, such as from gluconic acid. This strong linkage is shown by the extraordinary stability of the new compounds; their aqueous solutions may be diluted or heated without any precipitation occurring. Even on addition of magnesia mixture they remain clear. The compounds prepared from pentavalent antimony are especially stable.

For the preparation of the new compounds the glucosaminic acid preferably in an aqueous solution, is treated at ordinary or elevated temperature with antimony trihydroxide or with an oxyhydrate of the pentavalent antimony, until the solution becomes saturated. The antimony glucosaminates are then isolated from the filtered solutions by evaporating them to dryness or by introducing them into an organic solvent miscible with water.

The new compounds may also be prepared by treating the glucosaminic acid salts with tri- and pentahalogen compounds of antimony. This method has the disadvantage of yielding salts that contain a certain amount of the salts of hydrohalogen acids which are rather difficult to separate.

The following examples illustrate the new process, the parts being by weight:

Example 1

Into a solution of one part of glucosaminic acid in 30 parts of water there is introduced under stirring and at 50° C. by small portions and within 4 hours one part of antimony pentahydroxide. The mixture obtained is stirred during one hour, allowed to cool down, filtered from the excess of the antimony pentahydroxide through a tallow filter and the clear filtrate concentrated in vacuo to about 3 parts. By introducing this solution into 30 parts of absolute alcohol, the antimony glucosaminate is obtained in form of voluminous white flocks, which after standing settle down to a heavy powder. This is easily soluble in water with an acid reaction and the solution obtained is absolutely stable on boiling. Its probable formula is $(C_6H_{12}O_6N)_2Sb(OH)_3$. Antimony content found 20.5% (theor. 21.5%).

Example 2

Into a solution of one part of glucosaminic acid in 30 parts of water there are introduced under stirring and at 50° C. in small proportions and within 8 hours 4 parts of freshly prepared antimony trihydroxide. The obtained mixture is then filtered, the filtrate concentrated to about 10 parts and still warm diluted with a certain quantity of alcohol (95%) until the solution begins to become dull. The solution is then allowed to stand for some days, whereby the glucosaminic acid not entered into reaction crystallizes out. The same is then filtered off and the filtrate evaporated to dryness in vacuo.

The antimony glucosaminate prepared in this way constitutes a colorless heavy powder easily soluble in water with an acid reaction. Its aqueous solutions can be boiled without decomposition taking place. Its probable formula is $(C_6H_{11}O_6N)_2Sb.OH$. Antimony content found 23.6% (theor. 23.2%).

What we claim is:—

1. The complex antimony glucosaminates, prepared by the interaction of glucosaminic acid with antimony hydroxides, which constitute in dry state white nonhygroscopic powders easily soluble in water with an acid reaction and yielding stable solutions, which can be boiled without decomposition taking place.

2. The complex antimony glucosaminate prepared by the interaction of glucosaminic acid with antimony trihydroxide and which constitutes in dry state a colorless powder easily soluble in water with an acid reaction, yielding stable aqueous solutions which can be boiled without decomposition taking place.

3. The complex antimony glucosaminate prepared by the interaction of glucosaminic acid with antimony pentahydroxide and which constitutes in dry state a colorless powder, easily soluble in water with an acid reaction, yielding stable aqueous solutions, which can be boiled without decomposition taking place.

In witness whereof we have hereunto signed our names this 27th day of October, 1931.

ARTHUR STOLL.
ALBERT HOFMANN.